United States Patent
Kobayashi et al.

(10) Patent No.: US 12,074,489 B2
(45) Date of Patent: Aug. 27, 2024

(54) AXIAL GAP MOTOR

(71) Applicant: YAMAHA HATSUDOKI KABUSHIKI KAISHA, Iwata (JP)

(72) Inventors: Takayuki Kobayashi, Shizuoka (JP); Hirotaka Kurita, Shizuoka (JP); Tatsuya Hagiwara, Shizuoka (JP); Takumi Sugimura, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 235 days.

(21) Appl. No.: 17/859,483

(22) Filed: Jul. 7, 2022

(65) Prior Publication Data

US 2022/0345018 A1    Oct. 27, 2022

Related U.S. Application Data

(63) Continuation-in-part of application No. PCT/JP2020/047364, filed on Dec. 18, 2020.
(Continued)

(51) Int. Cl.
*H02K 29/03* (2006.01)
*H02K 1/16* (2006.01)
(Continued)

(52) U.S. Cl.
CPC .............. *H02K 29/03* (2013.01); *H02K 1/16* (2013.01); *H02K 1/2713* (2013.01); *H02K 3/12* (2013.01); *H02K 3/34* (2013.01); *H02K 21/24* (2013.01)

(58) Field of Classification Search
CPC .......... H02K 1/16; H02K 1/2713; H02K 3/12; H02K 21/24; H02K 29/03
(Continued)

(56) References Cited

U.S. PATENT DOCUMENTS 9,071,118 B2 * 6/2015 Takemoto .............. H02K 21/24
10,340,753 B2   7/2019 Rhyu et al.
(Continued)

FOREIGN PATENT DOCUMENTS

DE    10311819 A1   10/2004
EP    1450464 A1    8/2004
(Continued)

*Primary Examiner* — Rashad H Johnson
(74) *Attorney, Agent, or Firm* — Rabin & Berdo, P.C.

(57) ABSTRACT

An axial gap motor having a rotor and a stator core. A plurality of pressed powder teeth extends in a radial direction of the stator core and each has a trapezoidal shape in which a circumferential length of a pressed-powder-tooth-radial-direction-outer-end portion is larger than a circumferential length of a pressed-powder-tooth-radial-direction-inner-end portion. The rotor includes a plurality of field magnets, each configured such that a circumferential length of a magnet-radial-direction-inner-end portion is greater than or equal to a circumferential length of a magnet-radial-direction-outer-end portion. When the rotor and the stator core rotate relative to each other about a rotation axis, a part of the field magnets first overlaps with pressed-powder-tooth-radial-direction-inner portions of pressed powder teeth, and while the field magnets are located at a q-axis position with respect to the pressed powder teeth, adjacent ones of the field magnets individually overlap with one pressed powder tooth.

5 Claims, 10 Drawing Sheets

Related U.S. Application Data

(60) Provisional application No. 62/961,130, filed on Jan. 14, 2020.

(51) Int. Cl.
    *H02K 1/2713*   (2022.01)
    *H02K 3/12*     (2006.01)
    *H02K 3/34*     (2006.01)
    *H02K 21/24*    (2006.01)

(58) Field of Classification Search
    USPC .......................................... 310/67 R
    See application file for complete search history.

(56) References Cited

U.S. PATENT DOCUMENTS

| | | | |
|---|---|---|---|
| 2011/0316381 A1 | 12/2011 | Asano | |
| 2013/0187488 A1* | 7/2013 | Sakamoto | H02K 1/06 310/44 |
| 2013/0221788 A1* | 8/2013 | Yokota | H02K 1/2791 310/181 |
| 2014/0035422 A1* | 2/2014 | Mikami | H02K 15/03 310/156.71 |
| 2014/0252904 A1* | 9/2014 | Mikami | H02K 1/243 310/156.66 |
| 2014/0368077 A1* | 12/2014 | Yokota | H02K 21/04 310/181 |
| 2015/0091405 A1* | 4/2015 | Sakamoto | H02K 1/06 310/156.37 |
| 2015/0214797 A1* | 7/2015 | Sakamoto | H02K 21/24 310/44 |
| 2016/0268866 A1 | 9/2016 | Matsumoto | |
| 2019/0013708 A1* | 1/2019 | Hattori | H02K 3/522 |
| 2021/0384778 A1* | 12/2021 | Saito | H02K 1/02 |
| 2022/0263393 A1* | 8/2022 | Takahashi | H02K 1/276 |
| 2022/0278575 A1* | 9/2022 | Otsuka | H02K 1/146 |
| 2022/0329115 A1* | 10/2022 | Saito | H02K 21/24 |
| 2022/0345018 A1 | 10/2022 | Kobayashi et al. | |
| 2023/0046567 A1* | 2/2023 | Matsushita | H02K 49/102 |
| 2023/0163646 A1* | 5/2023 | Asano | H02K 1/145 310/257 |
| 2023/0187984 A1* | 6/2023 | Asari | H02K 21/22 310/257 |

FOREIGN PATENT DOCUMENTS

| | | |
|---|---|---|
| EP | 1460746 A1 | 9/2004 |
| EP | 1536542 A1 | 6/2005 |
| EP | 1746704 A2 | 1/2007 |
| EP | 3131188 A1 | 2/2017 |
| JP | S57-202866 A | 12/1982 |
| JP | 2006-333579 A | 12/2006 |
| JP | 2009-033946 A | 2/2009 |
| JP | 2010-088142 A | 4/2010 |
| JP | 5040407 B2 | 10/2012 |
| JP | S6210006 B2 | 10/2017 |
| WO | 03047069 A1 | 6/2003 |
| WO | 2004/017489 A1 | 2/2004 |
| WO | 2007/114079 A1 | 10/2007 |
| WO | 2009/057674 A1 | 5/2009 |
| WO | 2015114794 A1 | 8/2015 |
| WO | 2015/162708 A1 | 10/2015 |
| WO | 2019/077983 A1 | 4/2019 |

\* cited by examiner

AXIAL GAP MOTOR

CROSS-REFERENCE TO RELATED APPLICATIONS

This is a continuation-in-part application of International Application PCT/JP2020/047364, filed on Dec. 18, 2020, which claims priority from U.S. Provisional Application No. 62/961,130, filed on Jan. 14, 2020. The contents of the applications are incorporated herein by reference.

TECHNICAL FIELD

The present teaching relates to an axial gap motor.

BACKGROUND ART

In a known axial gap motor, a rotor including a plurality of field magnets and rotatable about a rotation axis and a stator including a stator core and a stator coil are located in an axial direction of the rotation axis. A known example of such an axial gap motor is an axial gap motor disclosed in Patent Document 1.

In this axial gap motor, a rotor includes an annular back yoke attached to a shaft and a plurality of permanent magnets disposed on a surface of the back yoke near a stator. As illustrated in, for example, FIG. 1 of Patent Document 1, each of the permanent magnets has an arc shape. The rotor is located in an axial direction of a rotation axis of the rotor with respect to the stator.

A stator core of the stator includes the annular back yoke disposed so as to be substantially orthogonal to the shaft and pressed powder iron core teeth provided on a surface of the back yoke near the rotor. The plurality of teeth extends along the shaft and are arranged around the shaft. A coil is wound around each of the teeth about the axis. The teeth are fixed to the back yoke by press fitting or bonding, for example.

As illustrated in, for example, FIG. 1 of Patent Document 1, each of the teeth has a triangular shape.

CITATION LIST

Patent Document

Patent Document 1: Japanese Patent No. 5040407

SUMMARY OF INVENTION

Technical Problem

It has been required for an axial gap motor having a configuration as described above to have an output torque as high as possible from the viewpoint of miniaturization, for example. In such a case of increasing an output torque of the axial gap motor, it is preferable for the size of permanent magnets of a rotor to be as large as possible, as disclosed in Patent Document 1.

In a case where permanent magnets of a rotor and teeth of a stator are formed to have the shapes described in Patent Document 1, the output torque of the axial gap motor can be increased, but a cogging torque and a torque ripple included in the output torque of the axial gap motor also increase.

The cogging torque and the torque ripple included in the output torque significantly affect performance of the motor. Thus, it has been required to reduce the cogging torque and the torque ripple included in the output torque. However, if the cogging torque and the torque ripple included in the output torque are reduced, the output torque itself can also decrease. For this reason, an axial gap motor capable of reducing the cogging torque and the torque ripple included in the output torque while suppressing decrease in the output torque has been demanded.

It is therefore an object of the present teaching to provide an axial gap motor capable of reducing a cogging torque and a torque ripple included in an output torque while suppressing decrease in the output torque.

Solution to Problem

Inventors of the present teaching have studied a configuration of an axial gap motor capable of reducing a cogging torque and a torque ripple included in an output torque while suppressing decrease in the output torque. Through an intensive study, the inventors arrived at the following configuration.

An axial gap motor according to one embodiment of the present teaching is an axial gap motor including: a rotor rotatable about a rotation axis, the rotor including a plurality of field magnets arranged around the rotation axis; a cylindrical stator core aligned with the rotor in an axial direction of the stator core, such that the rotation axis of the rotor is in the axial direction, the stator core including a yoke, and a plurality of teeth arranged along a circumferential direction of the stator core around the yoke; and a plurality of stator coils respectively wound around the plurality of teeth. Each of the plurality of teeth is formed of pressed particles. In a view of the plurality of teeth in the axial direction of the stator core, each of the plurality of teeth extends along a radial direction of the stator core, and has a tooth-radial-direction-outer-end portion located at an outer end of said each tooth in the radial direction of the stator core, a tooth-radial-direction-inner-end portion located at an inner end of said each tooth in the radial direction of the stator core, and a tooth-radial-direction-inner portion located inward of a center of said each tooth in the radial direction of the stator core. Said each tooth being formed of a trapezoidal shape in which a circumferential length of the tooth-radial-direction-outer-end portion is larger than a circumferential length of the tooth-radial-direction-inner-end portion. Each two of the plurality of teeth adjacent to each other in the circumferential direction of the stator core form a slot for accommodating the stator coil, the slot being of a rectangular in said view of the plurality of teeth in the axial direction. Each of the plurality of field magnets has a magnet-radial-direction-inner-end portion located at an inner end of said each field magnet in the radial direction of the stator core, and a magnet-radial-direction-outer-end portion located at an outer end of said each field magnet in the radial direction of the stator core, a circumferential length of the magnet-radial-direction-inner-end portion being greater than or equal to a circumferential length of the magnet-radial-direction-outer-end portion; and the rotor and the stator core are configured to rotate relative to each other about the rotation axis, by which, in a view of the rotor and the stator core in the axial direction of the stator core, a part of each of the plurality of field magnet first overlaps with the tooth-radial-direction-inner portion of one of the plurality of teeth, and in a case where the plurality of field magnets are located at a quadrature axis (q-axis) position with respect to the plurality of teeth, each adjacent two of the plurality of field magnets overlap with one of the plurality of teeth.

The teeth are formed of pressed particles and, when the teeth are seen along the axial direction, extend in the radial direction of the stator core and each have a trapezoidal shape in which the circumferential length of the tooth-radial-direction-outer-end portion is larger than the circumferential length of the tooth-radial-direction-inner-end portion. In each of the field magnets, the circumferential length of the magnet-radial-direction-inner-end portion is greater than or equal to the circumferential length of the magnet-radial-direction-outer-end portion. With these shapes of the teeth and the field magnets, in the case where the rotor rotates about the rotation axis with respect to the stator, the field magnets first overlap with the tooth-radial-direction-inner portions of the teeth when the rotor and the stator are seen along the axial direction. An output torque of the axial gap motor is significantly affected by magnetic fluxes occurring in the tooth-radial-direction-inner portions of the teeth by the field magnets. As described above, in the case where the rotor and the stator rotate relative to each other about the rotation axis, the field magnets first overlap with the tooth-radial-direction-inner portions when the rotor and the stator are seen along the axial direction. Thus, a decrease in output torque of the axial gap motor can be suppressed.

In addition, in the configuration described above, while the field magnets are located at the q-axis position with respect to the teeth, adjacent ones of the plurality of field magnets individually overlap with one tooth when the plurality of field magnets and the plurality of teeth are seen along the axial direction. Accordingly, it is possible to suppress a significant change of magnetic fluxes occurring in the teeth by the plurality of field magnets. In this manner, a change of magnetic fluxes occurring in the teeth of the stator by the field magnets of the rotor is suppressed so that a torque pulsation occurring in the rotor can be suppressed. Consequently, a cogging torque and a torque ripple included in the output torque of the axial gap motor can be reduced.

Thus, it is possible to provide an axial gap motor capable of reducing a cogging torque and a torque ripple included in an output torque while suppressing a decrease in the output torque.

In another aspect, the axial gap motor according to the present teaching preferably includes the following configuration. Each of the plurality of teeth further has tooth-circumferential-direction-end portions located at end portions of said each tooth in the circumferential direction of the stator core and extending in the radial direction of the stator core. Each of the plurality of field magnets is configured to cover the tooth-circumferential-direction-end portions of adjacent ones of the plurality of teeth, in said view of the rotor and the stator core in the axial direction while the field magnets are located at the q-axis position with respect to the teeth.

With this configuration, while field magnets are located at the q-axis position with respect to the teeth, the field magnets of the rotor overlap with the tooth-circumferential-direction-end portions of the teeth of the stator core when the rotor and the stator core are seen along the axial direction. Thus, it is possible to suppress a significant change, at the q-axis position, of magnetic fluxes occurring in the teeth by the field magnets.

In addition, the configuration described above can increase the output torque of the axial gap motor, as compared to a case where the field magnets of the rotor do not overlap with the tooth-circumferential-direction-end portions of the teeth of the stator core while the field magnets are located at the q-axis position with respect to the teeth.

Thus, it is possible to provide an axial gap motor capable of reducing a cogging torque and a torque ripple included in an output torque while suppressing a decrease in the output torque.

In another aspect, the axial gap motor according to the present teaching preferably includes the following configuration. The plurality of field magnets is so configured that the magnet-radial-direction-inner-end portion of at least one of the plurality of field magnets always overlaps with each tooth-radial-direction-inner portion of the plurality of teeth in said view of the rotor and the stator core in the axial direction of the stator core in a case where the rotor and the stator core rotate relative to each other about the rotation axis.

Accordingly, it is possible to suppress a significant change, at the q-axis position, of magnetic fluxes occurring in the teeth of the stator core by the field magnets of the rotor when the rotor and the stator core rotate relative to each other about the rotation axis. In addition, the configuration described above can increase an output torque of the axial gap motor, as compared to a case where when the rotor rotates about the rotation axis with respect to the stator core, the magnet-radial-direction-inner-end portions do not always overlap with the plurality of teeth when the rotor and the stator core are seen along the axial direction.

In another aspect, the axial gap motor according to the present teaching preferably includes the following configuration. Each of the plurality of field magnets has a rectangular shape in which the circumferential length of the magnet-radial-direction-inner-end portion is equal to the circumferential length of the magnet-radial-direction-outer-end portion, in said view of the rotor in the axial direction of the stator core.

Accordingly, it is possible to maximize a region where the field magnets of the rotor overlap with the teeth of the stator core when the rotor and the stator core are seen along the axial direction while reducing a cogging torque and a torque ripple included in an output torque when the rotor and the stator core rotate relative to each other about the rotation axis.

Thus, it is possible to provide an axial gap motor capable of reducing a cogging torque and a torque ripple included in an output torque while suppressing a decrease in the output torque.

In another aspect, the axial gap motor according to the present teaching preferably includes the following configuration. Each of the plurality of field magnets is configured such that the magnet-radial-direction-inner-end portion thereof is located outward of the tooth-radial-direction-inner-end portion of each of the plurality of teeth in the radial direction of the stator core in said view of the rotor and the stator core in the axial direction of the stator core.

Accordingly, it is possible to increase an output torque, as compared to a case where the magnet-radial-direction-inner-end portions of the field magnets are located inward of the tooth-radial-direction-inner-end portions in the radial direction when the rotor and the stator core are seen along the axial directions.

The terminology used herein is for the purpose of describing particular embodiments only and is not intended to be limiting of the invention.

As used herein, the term "and/or" includes any and all combinations of one or more of the associated listed items.

It will be further understood that the terms "including," "comprising" or "having" and variations thereof when used in this specification, specify the presence of stated features, steps, elements, components, and/or their equivalents but do not preclude the presence or addition of one or more steps, operations, elements, components, and/or groups thereof.

It will be further understood that the terms "mounted," "connected," "coupled," and/or their equivalents are used broadly and encompass both direct and indirect mounting, connecting and coupling. Further, "connected" and "coupled" are not restricted to physical or mechanical connections or couplings, and can include connections or couplings, whether direct or indirect.

Unless otherwise defined, all terms (including technical and scientific terms) used herein have the same meaning as commonly understood by one having ordinary skill in the art to which this invention belongs.

It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

An embodiment of an axial gap motor according to the present teaching will be herein described.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

[Axial Gap Motor]

An axial gap motor herein refers to a motor in which a rotor and a stator are arranged in an axial direction of a rotation axis of the rotor, and the rotor rotates about the rotation axis. The rotor includes a plurality of field magnets arranged along a circumferential direction about the rotation axis. The stator includes a plurality of teeth arranged along the circumferential direction about the rotation axis. A stator coil is wound around each of the plurality of teeth. The plurality of field magnets of the rotor and the plurality of teeth of the stator are opposed to each other in the axial direction. Accordingly, the axial gap motor has a gap in the axial direction (axial gap) between the plurality of field magnets and the plurality of teeth.

[Pressed Particles]

Pressed particles herein refer to particulates including particles of a magnetic material. Pressed powder teeth, for example, are formed by pressing pressed particles. A base yoke may be formed of pressed particles.

[Tooth-Radial-Direction-Outer-End Portion]

A tooth-radial-direction-outer-end portion herein refers to a portion of a tooth extending in the radial directions of a stator core, the tooth-radial-direction-outer-end portion being located at the outer end in the radial directions. A circumferential length of the tooth-radial-direction-outer-end portion refers to, for example, a circumferential length of an outermost portion of the tooth-radial-direction-outer-end portion.

[Tooth-Radial-Direction-Inner-End Portion]

A tooth-radial-direction-inner-end portion herein refers to a portion of a tooth extending in the radial directions of the stator core, the tooth-radial-direction-inner-end portion being located at the inner end in the radial directions. A circumferential length of the tooth-radial-direction-inner-end portion refers to, for example, a circumferential length of an innermost portion of the tooth-radial-direction-inner-end portion.

[Tooth-Radial-Direction-Inner Portion]

A tooth-radial-direction-inner portion herein refers to a portion of a tooth extending in the radial directions of the stator core, the tooth-radial-direction-inner portion being located inward of a center of the tooth in the radial directions. The tooth-radial-direction-inner portion includes the tooth-radial-direction-inner-end portion.

[Magnet-Radial-Direction-Outer-End Portion]

A magnet-radial-direction-outer-end portion herein refers to a portion of a filed magnet located at the outer end in the radial directions of the field magnet in the radial directions of the stator core. A circumferential length of the magnet-radial-direction-outer-end portion refers to, for example, a circumferential length of an outermost portion of the magnet-radial-direction-outer-end portion.

[Magnet-Radial-Direction-Inner-End Portion]

A magnet-radial-direction-inner-end portion herein refers to a portion of a filed magnet located at the inner end in the radial directions of the field magnet in the radial directions of the stator core. A circumferential length of the magnet-radial-direction-inner-end portion refers to, for example, a circumferential length of an innermost portion of the magnet-radial-direction-inner-end portion.

[q-Axis Position]

A state where a field magnet is located at a q-axis position with respect to a tooth refers to a state where a center of the tooth in the circumferential direction is located at a position overlapping with a center of an interval between two of a plurality of field magnets of the rotor adjacent to each other in the circumferential direction, when the rotor and the stator core are seen along the axial direction.

Advantageous Effects of Invention

According to one embodiment of the present teaching, it is possible to provide an axial gap motor capable of reducing a cogging torque and a torque ripple included in an output torque while suppressing a decrease in the output torque.

DESCRIPTION OF EMBODIMENT

Figure 1:
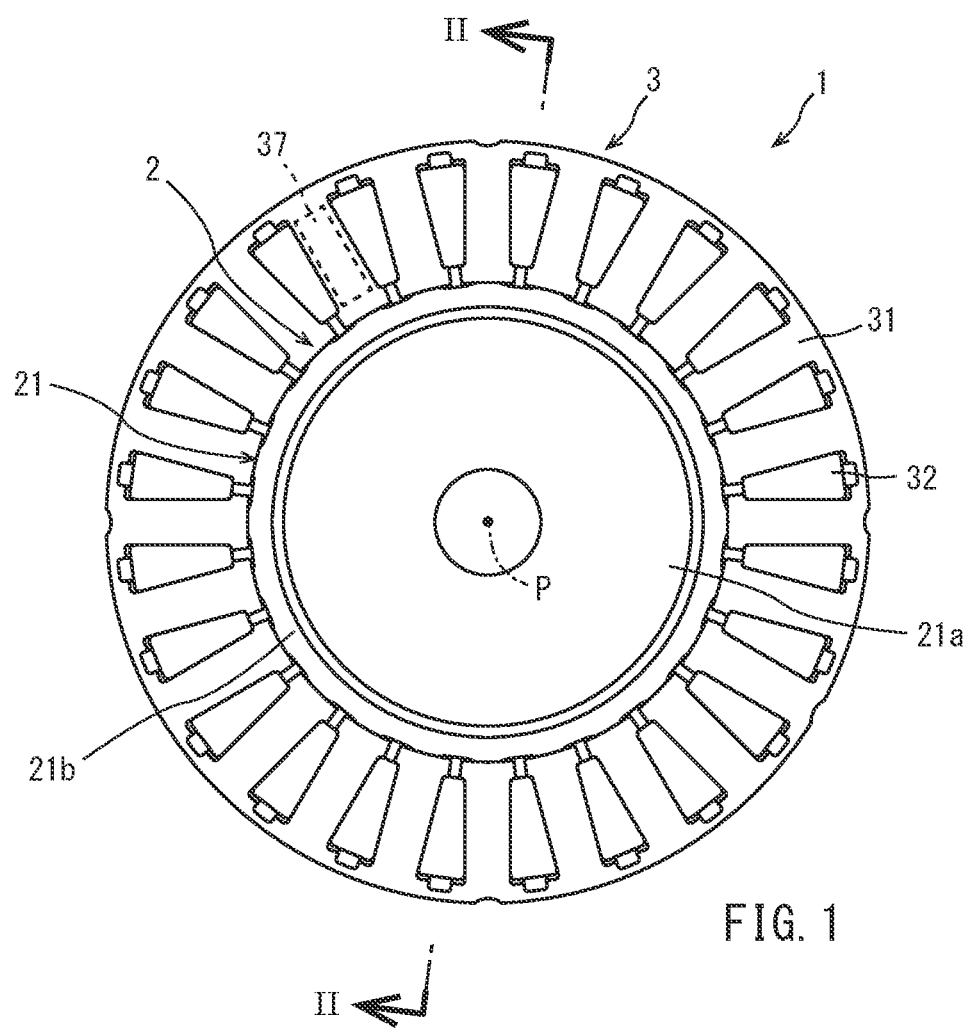
FIG. 1 is a view of an axial gap motor according to an embodiment seen in a first direction.

An embodiment will be described hereinafter with reference to the drawings. In the drawings, the same or corresponding parts are denoted by the same reference numerals, and description thereof will not be repeated. The dimensions of components in the drawings do not strictly represent actual dimensions of the components and dimensional proportions of the components.

Directions along which a rotation axis P of an axial gap motor 1 extends will be hereinafter referred to as "axial directions" and radial directions of a rotor of the axial gap motor 1 will be hereinafter referred to as "radial directions." Directions along which a rotor 2 of the axial gap motor 1 rotates about the rotation axis P will be referred to as "circumferential direction." The radial directions are directions orthogonal to the rotation axis P of the axial gap motor 1.

A direction in which a stator 3 and the rotor 2 are arranged in this order in the axial directions will be hereinafter referred to as a first direction. In the axial directions, a direction in which the rotor 2 and the stator 3 are arranged in this order will be referred to as a second direction.

<Overall Configuration>

Figure 2:
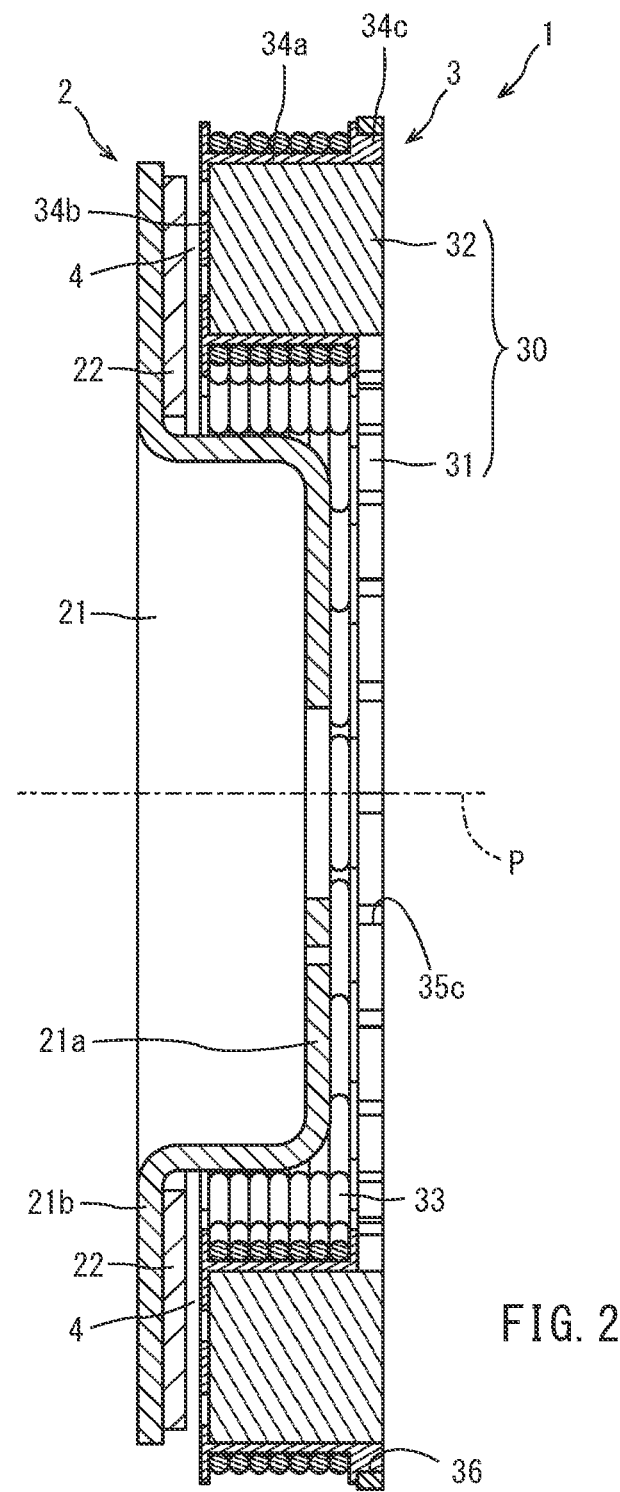
FIG. 2 is a cross-sectional view taken along line II-II in FIG. 1.

With reference to FIGS. 1 and 2, the axial gap motor 1 according to a first embodiment will be described. FIG. 1 is a plan view illustrating a schematic configuration of the axial gap motor 1. FIG. 1 is a view in which the stator 3 of the axial gap motor 1 is seen in the first direction. FIG. 2 is a cross-sectional view illustrating a cross section of the axial gap motor 1 taken along line II-II in the radial directions.

As illustrated in FIG. 2, the axial gap motor 1 according to this embodiment is, for example, a motor in which the rotor 2 and the stator 3 are arranged in the axial directions, and the rotor 2 rotates about the rotation axis P.

The axial gap motor 1 includes the rotor 2 and the stator 3. The rotor 2 and the stator 3 are opposed to each other in the axial directions. The rotor 2 and the stator 3 are disposed to have a predetermined gap 4 in the axial directions.

The rotor 2 rotates about the rotation axis P with respect to the stator 3. The rotor 2 includes a rotor yoke 21 and a plurality of field magnets 22.

The rotor yoke 21 is, for example, a hat-shaped member constituted by a ferromagnet steel sheet. That is, the rotor yoke 21 includes a bottomed cylindrical rotor yoke projection 21a and an annular rotor yoke flange 21b disposed to surround the rotor yoke projection 21a.

An unillustrated rotor shaft penetrates the rotor yoke projection 21a. The rotor shaft is connected to the rotor yoke projection 21a. Accordingly, the rotor yoke 21 rotates integrally with the rotor shaft. An axis of the rotor shaft coincides with the rotation axis P. A direction in which the rotor yoke projection 21a projects is the second direction of the axis directions of the rotation axis P. The rotor yoke projection 21a and the rotor yoke flange 21b are integrally formed. In the axial gap motor 1, the rotor yoke projection 21a is located inward of the annular stator 3 described later in the radial directions.

The rotor yoke may have a shape other than the hat shape, such as a disc shape or a cylindrical shape. The rotor yoke may have any shape as long as the rotor yoke is rotatable together with the rotor shaft with field magnets 22 described later being held.

The field magnets 22 are rectangular flat-plate members. The field magnets 22 are fixed to the rotor yoke flange 21b. In this embodiment, the field magnets 22 are fixed on a surface of the rotor yoke flange 21b located in the projection direction of the rotor yoke projection 21a. On the rotor yoke flange 21b, the plurality of field magnets 22 are arranged at regular intervals along the circumferential direction. Accordingly, when the rotor 2 rotates about the rotation axis P, the field magnets 22 also rotate about the rotation axis P. The field magnets 22 will be described later in detail.

The field magnets 22 may be fixed to the rotor yoke flange 21b in any manner such as adhesion, screwing, welding, or deposition. The field magnets 22 may have other shapes such as a round shape, or a shape other than the plate shape, such as a rod shape.

The field magnets 22 generate magnetic fluxes in the thickness directions. That is, in this embodiment, the directions of magnetic fluxes generated by the field magnets 22 are axial directions in the rotor 2. The directions of magnetic fluxes generated by the field magnets 22 may be changed depending on the configuration of the motor.

The stator 3 is configured to be cylindrical as a whole. The stator 3 and the rotor 2 are arranged in the axial directions such that the rotor yoke projection 21a is located inward of the stator 3 in the radial directions. The stator 3 includes a stator core 30, stator coils 33, and resin bobbins 34. The stator core 30 includes a base yoke 31 and a plurality of pressed powder teeth 32 (teeth). In the stator 3 of this embodiment, the base yoke 31 is a member separate from the plurality of pressed powder teeth 32.

Figure 3:
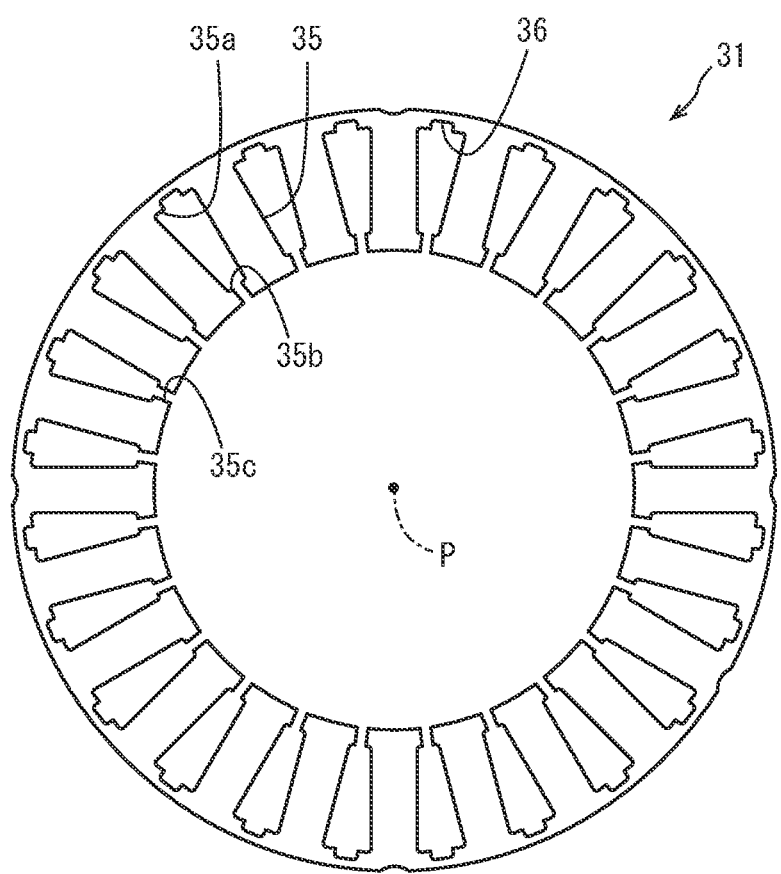
FIG. 3 is a view illustrating a schematic configuration of a base yoke.

FIG. 3 is a plan view illustrating a schematic configuration of the base yoke 31. The base yoke 31 is constituted by, for example, an annular plate-shaped magnetic material such as an electromagnetic steel sheet. The base yoke 31 may be configured by laminating electromagnetic steel sheets in the thickness direction or may be made of pressed powder or an amorphous material, for example, as long as the base yoke 31 is a magnetic material.

The base yoke 31 includes a plurality of tooth holes 35 as a plurality of insertion holes arranged along the circumferential direction. The pressed powder teeth 32 described later are individually inserted in the plurality of tooth holes 35. The stator 3 includes slots 37 each located between adjacent ones of the pressed powder teeth 32. The stator coils 33 wound around the pressed powder teeth 32 are housed in the slots 37. In this embodiment, as indicated by a broken line in FIG. 1, each of the slots 37 has a rectangular shape when the stator 3 is seen along the axial directions. That is, the pressed powder teeth 32 are trapezoidal in cross section to constitute the rectangular slots 37 when the stator 3 is seen along the axial directions, which will be described in detail later. Although FIG. 1 shows only one slot 37, the rectangular slots 37 are individually formed between each adjacent ones of the pressed powder teeth 32.

As illustrated in FIG. 1, the tooth holes 35 extend along the radial directions of the base yoke 31 when the stator 3 is seen along the axial directions. In each of the tooth holes 35, when the stator 3 is seen along the axial directions, a circumferential length of a tooth-hole-radial-direction-outer-end portion 35a including an end surface of the base yoke 31 constituting the outer end of the corresponding tooth hole 35 in the radial directions is larger than a circumferential length of a tooth-hole-radial-direction-inner-end portion 35b including an end surface of the base yoke 31 constituting the inner end of the corresponding tooth hole 35 in the radial directions. That is, each tooth hole 35 has a trapezoidal shape whose width in the circumferential direction increases toward the outer side of the base yoke 31 in the radial direction when the stator 3 is seen along the axial directions.

Each tooth hole 35 has a slit 35c extending along the radial directions, in an innermost peripheral portion of the annular plate-shaped base yoke 31. Accordingly, the tooth hole 35 is open to the inside of the base yoke 31. The width of the slit 35c along the circumferential direction is smaller than the circumferential length of the tooth-hole-radial-direction-inner-end portion 35b of the tooth hole.

The base yoke 31 includes a plurality of positioning-portion-insertion holes 36 arranged along the circumferential direction. Pressed-powder-tooth-positioning portions 34c of the resin bobbins 34 described later are individually inserted in the plurality of positioning-portion-insertion holes 36. The base yoke 31 has the same number of the positioning-portion-insertion holes 36 as the number of the tooth holes 35. The positioning-portion-insertion holes 36 are located outward of the tooth holes 35 in the radial directions of the base yoke 31. That is, in the state where the pressed powder teeth 32 are inserted in the tooth holes 35, the positioning-portion-insertion holes 36 are located outward of the pressed powder teeth 32 in the radial directions.

In this embodiment, the positioning-portion-insertion holes 36 are constituted by notches formed in the tooth-hole-radial-direction-outer-end portions 35a of the tooth holes 35. That is, the positioning-portion-insertion holes 36 are continuously formed in at least a part of the tooth-hole-radial-direction-outer-end portions 35a. A circumferential length of the positioning-portion-insertion holes 36 is smaller than a circumferential length of the tooth-hole-radial-direction-outer-end portions 35a.

The positioning-portion-insertion holes may be located inward of the tooth holes 35 in the radial directions of the base yoke 31. That is, in the state where the pressed powder teeth 32 are inserted in the tooth holes 35, the positioning-portion-insertion holes 36 may be located inward of the pressed powder teeth 32 in the radial directions.

Figure 4A:
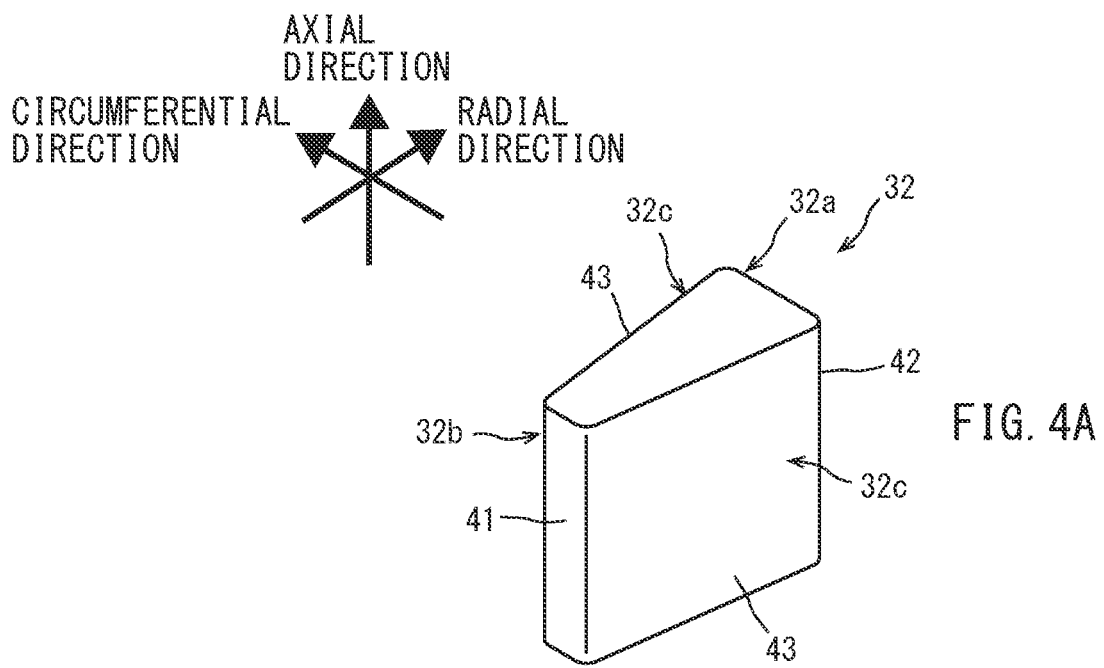
FIG. 4A is a perspective view illustrating a schematic configuration of a pressed powder tooth.
Figure 4B:
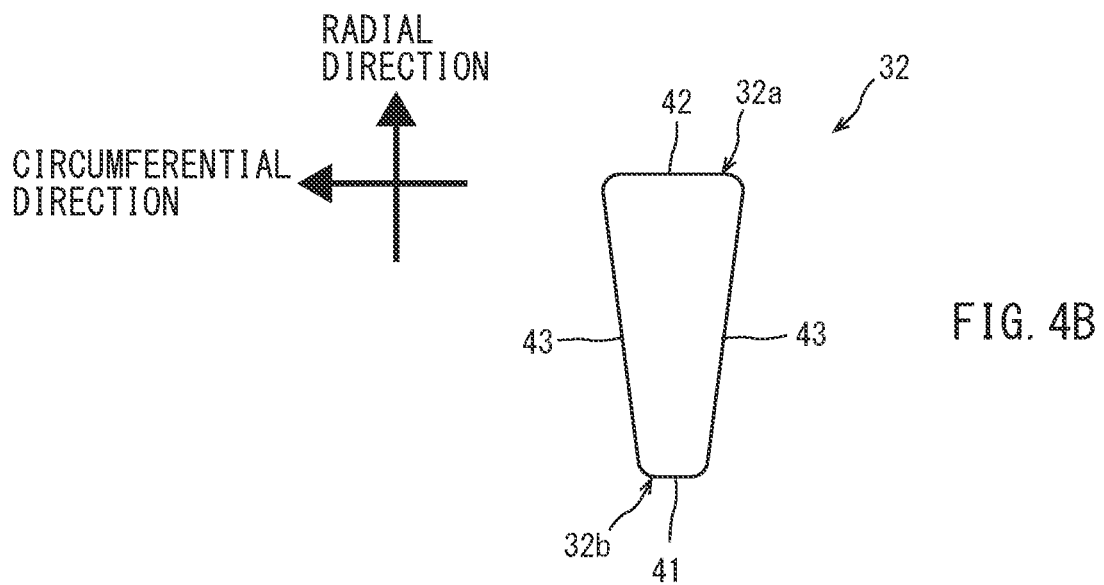
FIG. 4B is a view of the pressed powder tooth seen along an axial direction.

FIG. 4A is a perspective view illustrating a schematic configuration of the pressed powder tooth 32. FIG. 4B is a view of the pressed powder tooth 32 seen along the axial directions. The pressed powder teeth 32 are constituted by particulates including particles of a magnetic material. Specifically, the pressed powder teeth 32 are formed by molding the particulates into a columnar shape under a predetermined pressure with a molding die.

The pressed powder teeth 32 are columnar parts having trapezoidal cross sections and extending along the axial directions of the rotation axis P. The pressed powder teeth 32 are inserted in the tooth holes 35 of the base yoke 31 such that the thickness directions of the base yoke 31 coincide with the axial directions of the pressed powder teeth 32. Accordingly, the pressed powder teeth 32 are arranged along the circumferential direction about the rotation axis P with respect to the base yoke 31.

In the state where the pressed powder teeth 32 are inserted in the tooth holes 35 of the base yoke 31, the pressed powder teeth 32 extend along the radial directions of the stator 3 when the pressed powder teeth 32 are seen along the axial directions of the rotation axis P, and the circumferential length of each pressed-powder-tooth-radial-direction-outer-end portion 32a (tooth-radial-direction-outer-end portion) located at the outer end of the corresponding pressed powder tooth 32 in the radial directions is larger than the circumferential length of each pressed-powder-tooth-radial-direction-inner-end portion 32b (tooth-radial-direction-inner-end portion) located at the inner end of the corresponding pressed powder tooth 32 in the radial directions.

Each of the pressed powder teeth 32 includes a pressed-powder-tooth-bottom surface 41 that is a surface of the pressed-powder-tooth-radial-direction-inner-end portion 32b constituting a shorter side of a trapezoidal cross section, a pressed-powder-tooth-upper surface 42 that is a surface of the pressed-powder-tooth-radial-direction-outer-end portion 32a constituting a longer side of the cross section, and a pressed-powder-tooth-side surface 43 that is a surface of a pressed-powder-tooth-circumferential-direction-end portion 32c (tooth-circumferential-direction-end portion) constituting an oblique side connecting the pressed-powder-tooth-bottom surface 41 and the pressed-powder-tooth-upper surface 42 in the cross section. The pressed-powder-tooth-circumferential-direction-end portion 32c is located at an end of each of the pressed powder teeth 32 along the circumferential direction, and extends along the radial directions of the stator core 30 in the state where the pressed powder teeth 32 are attached to the base yoke 31. In this embodiment, the cross-sectional shape and the cross-sectional area of the pressed powder teeth 32 are the same in the axial directions of the rotation axis P.

In each of the columnar pressed powder teeth 32, at least one of a longitudinal dimension or a transverse dimension of the cross section may gradually decrease in the axial direction. That is, each of the pressed powder teeth 32 may have a draft angle in the axial directions.

In the axial gap motor 1 having the configuration described above, each of the pressed powder teeth 32 may have a trapezoidal shape having the following dimensional relationship.

Supposing that
   the number of slots of the stator 3: S,
   offset amount: w,
   distance from the center of the stator 3 to the pressed-powder-tooth-bottom surface 41: r1, and
   distance from the center of the stator 3 to the pressed-powder-tooth-upper surface 42: r2,
   the pressed powder teeth 32 may have a trapezoidal shape defined by:
   core height: r1−r2
   angle formed by an oblique side: $2\pi/S$
   upper surface length: $2\times(r2-w/\sin(\pi/S))\times\tan(\pi/S)$
   bottom surface length: $2\times(r1-w/\sin(\pi/S))\times\tan(\pi/S)$ The trapezoidal pressed powder teeth 32 satisfying the foregoing relationship are inserted in the tooth holes 35 of the base yoke 31 so that the pressed-powder-tooth-side surfaces 43 of the pressed powder teeth 32 adjacent to each other in the circumferential direction are parallel. Accordingly, a space in which the stator coils 33 are wound around the pressed powder teeth 32 can be obtained between the pressed powder teeth 32 adjacent to each other in the circumferential direction.

The expression "parallel" includes not only a case where the pressed-powder-tooth-side surfaces 43 of the adjacent pressed powder teeth 32 do not completely intersect with each other but also a case where an angle formed by the pressed-powder-tooth-side surfaces 43 of the adjacent pressed powder teeth 32 is less than 90 degrees.

With the configuration described above, the space factor of the stator coils 33 in the stator 3 increases so that the number of windings of the stator coils 33 in the same cross-sectional area can be increased. Thus, an output torque of the axial gap motor 1 can be enhanced. In addition, since the space factor of the stator coils 33 can be increased as described above, the size of the stator coils 33 can be increased, and square wires or edgewise wires can be wound as the stator coils 33. When the space factor of the stator coils 33 increases, an electrical resistance of the stator coils 33 can be reduced, and a copper loss, which is a cause of heat generation of the stator coils 33, can also be reduced.

With the configuration described above, although the diameter of wound wires needs to be large in order to uniformize the resistance of the stator coils 33, Al coils can also be wound. Accordingly, the weight of the axial gap motor 1 can also be reduced.

Figure 5:
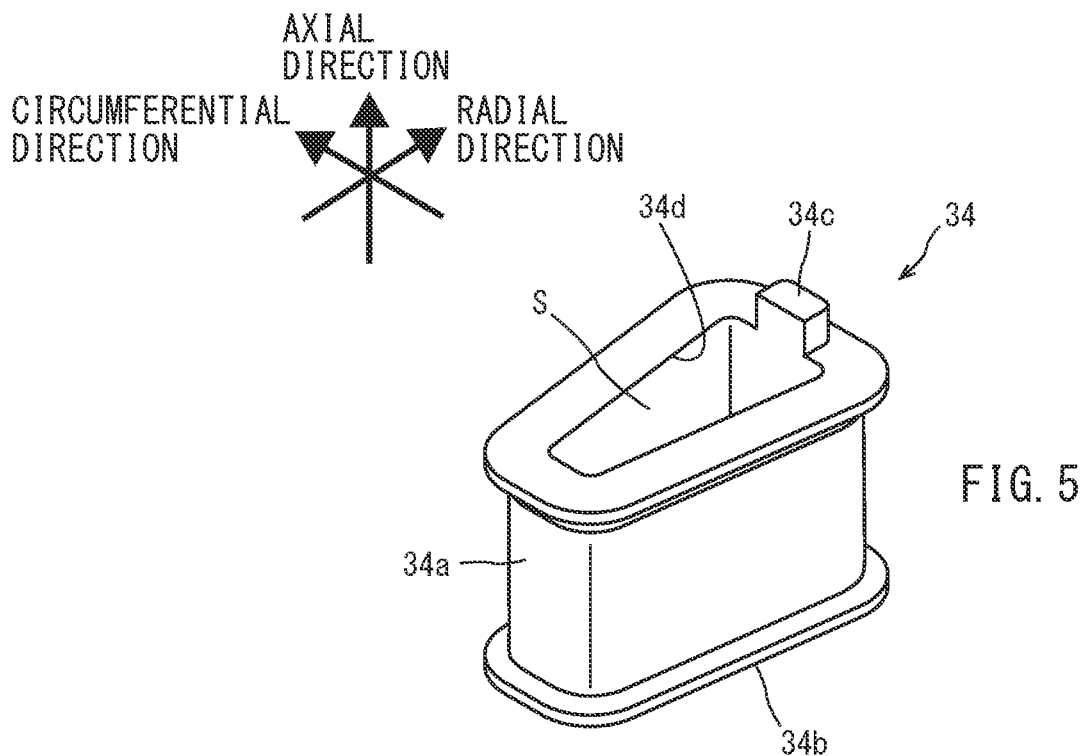
FIG. 5 is a perspective view illustrating a schematic configuration of a resin bobbin.

Each of the plurality of pressed powder teeth 32 is equipped with a resin bobbin 34. FIG. 5 is a perspective view illustrating a schematic configuration of the resin bobbin 34. The resin bobbin 34 is a bottomed cylindrical resin member. Specifically, the resin bobbin 34 includes a side surface 34a, a bottom surface 34b, and a pressed-powder-tooth-positioning portion 34c. In this embodiment, the side surface 34a, the bottom surface 34b, and the pressed-powder-tooth-positioning portion 34c are integrally formed.

The side surface 34a is configured to define a pressed-powder-tooth-housing space S having a trapezoidal cross-sectional shape and capable of housing the pressed powder tooth 32 having a trapezoidal cross-sectional shape. The bottom surface 34b is located at one side of the resin bobbin 34 in the axial directions with respect to the side surface 34a, and defines one side of the pressed-powder-tooth-housing space S in the axial directions. The other side of the pressed-powder-tooth-housing space S in the axial directions is constituted by an opening 34d surrounded by the side surface 34a of the resin bobbin 34. The axial directions coincide with the axial directions of the rotation axis P in the axial gap motor 1.

The length of the pressed-powder-tooth-housing space S along the axial directions is smaller than the length of the pressed powder tooth 32 along the axial directions. Thus, in the state where the pressed powder tooth 32 is housed in the pressed-powder-tooth-housing space S, the pressed powder tooth 32 projects with respect to the side surface 34a in the axial direction.

The pressed-powder-tooth-positioning portion 34c is a projection that extends from the side surface 34a constituting the opening 34d in the axial direction. The pressed-powder-tooth-positioning portion 34c has a shape with which the pressed-powder-tooth-positioning portion 34c can be inserted in a positioning-portion-insertion hole 36 of the base yoke 31.

Figure 6:
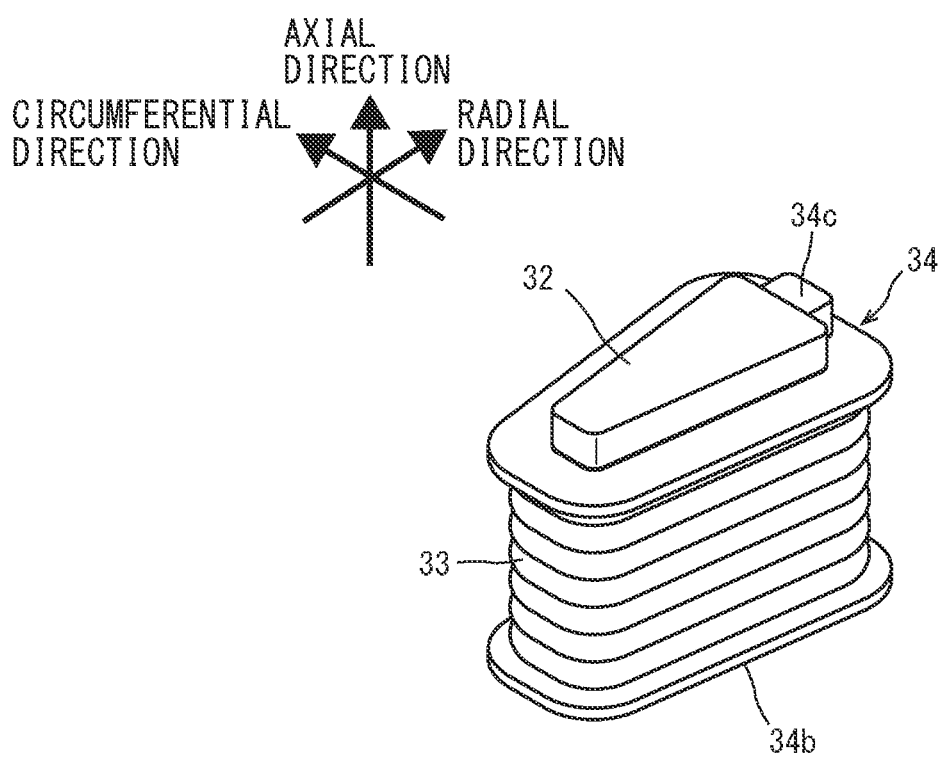
FIG. 6 is a perspective view illustrating a state where a pressed powder tooth is inserted in a pressed-powder-tooth-housing space of the resin bobbin and a stator coil is wound on a side surface of the resin bobbin.

FIG. 6 is a perspective view illustrating a state where the pressed powder tooth 32 is inserted in the pressed-powder-tooth-housing space S of the resin bobbin 34 and the stator coil 33 is wound on the side surface 34a of the resin bobbin 34. As illustrated in FIG. 6, by inserting the pressed powder tooth 32 in the pressed-powder-tooth-housing space S of the resin bobbin 34, the pressed powder tooth 32 is covered with the resin bobbin 34. The stator coil 33 is wound on the side surface 34a of the resin bobbin 34. Accordingly, the pressed powder tooth 32 is electrically isolated from the stator coil 33.

Figure 7:
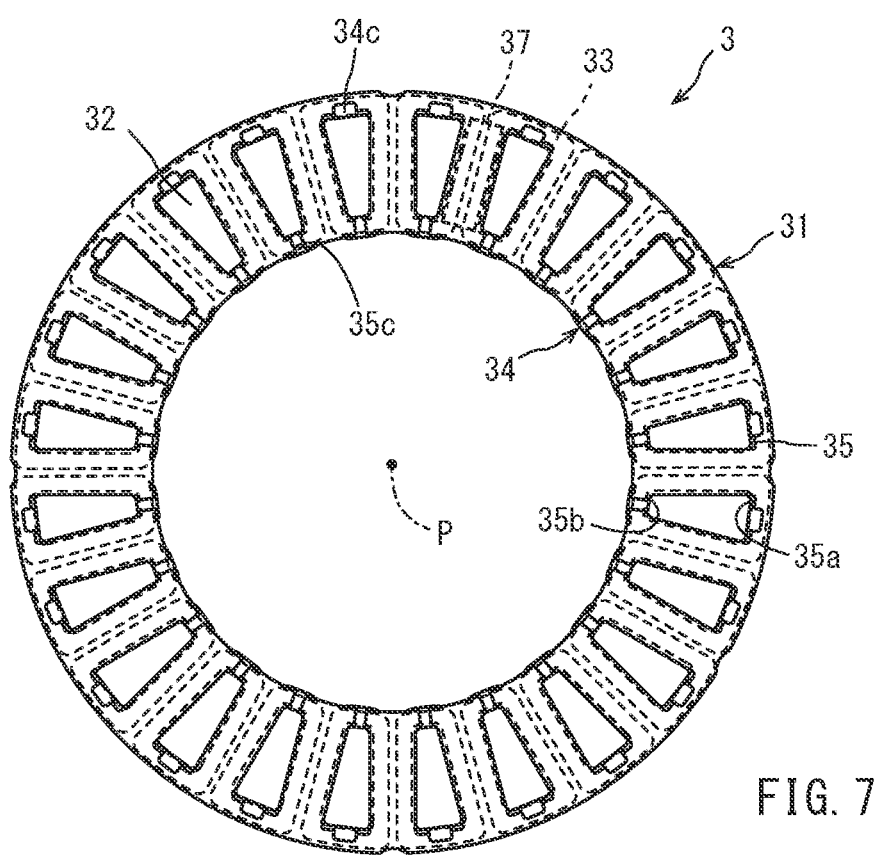
FIG. 7 is a view of a stator seen in the first direction.
Figure 8:
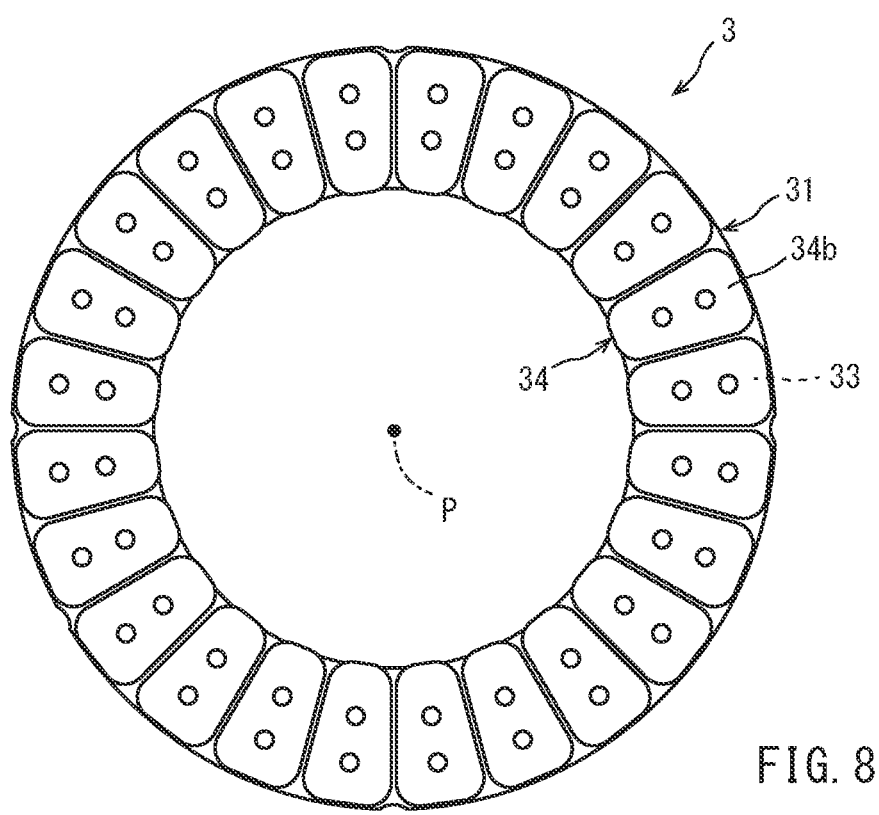
FIG. 8 is a view of a stator seen in a second direction.

FIG. 7 is a view illustrating a state where the resin bobbins 34 and the pressed powder teeth 32 are attached to the base yoke 31, when seen in the first direction. FIG. 8 is a view illustrating a state where the resin bobbins 34 and the pressed powder teeth 32 are attached to the base yoke 31, when seen in the second direction. As illustrated in FIGS. 7 and 8, the resin bobbins 34 in which the pressed powder teeth 32 are housed in the pressed-powder-tooth-housing spaces S and the stator coils 33 are wound on the side surfaces 34a are attached to the base yoke 31 such that the pressed-powder-tooth-positioning portions 34c are inserted in the positioning-portion-insertion holes 36 of the base yoke 31. Accordingly, the pressed powder teeth 32 are positioned in the tooth holes 35 of the base yoke 31 such that the pressed-powder-tooth-radial-direction-inner-end portions 32b of the pressed powder teeth 32 are in contact with the tooth-hole-radial-direction-inner-end portions 35b of the tooth holes 35. Thus, the resin bobbins 34 and the pressed powder teeth 32 are positioned relative to the base yoke 31.

The slot 37 having a rectangular shape when the stator 3 is seen along the axial directions is formed between the resin bobbins 34 covering the pressed powder teeth 32 adjacent to each other in the circumferential direction. Accordingly, the stator coils 33 wound on the side surfaces 34a of the resin bobbins 34 are housed in the slots 37.

With the configuration described above, the stator 3 is configured such that the pressed powder teeth 32 are individually inserted in the plurality of tooth holes 35 of the base yoke 31.

Although not specifically shown, the stator 3 having the configuration described above may be resin-molded by insert molding using a resin.

In the manner described above, the base yoke 31 and the pressed powder teeth 32 of the stator 3 are resin-molded in a final step of stator assembly so that it is possible to suppress generation of stress concentration on the base yoke 31 and the pressed powder teeth 32 to a torque reaction force occurring in the axial gap motor 1. This can obtain strength of the fragile pressed powder teeth 32.

<Field Magnet>

Figure 9:
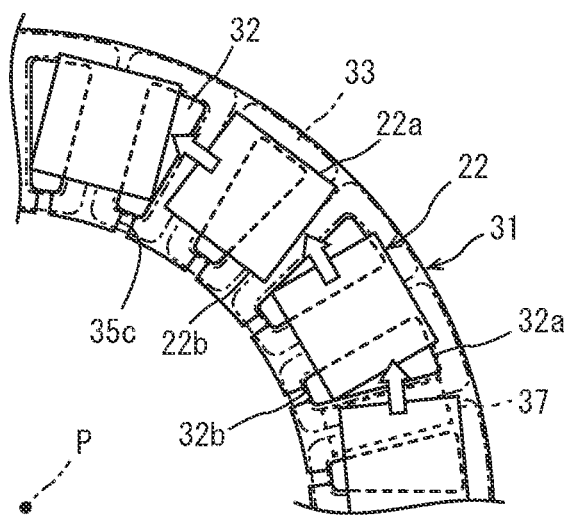
FIG. 9 is a view illustrating a state where a rotor rotates about a rotation axis with respect to the stator, when seen along the axial direction.
Figure 10:
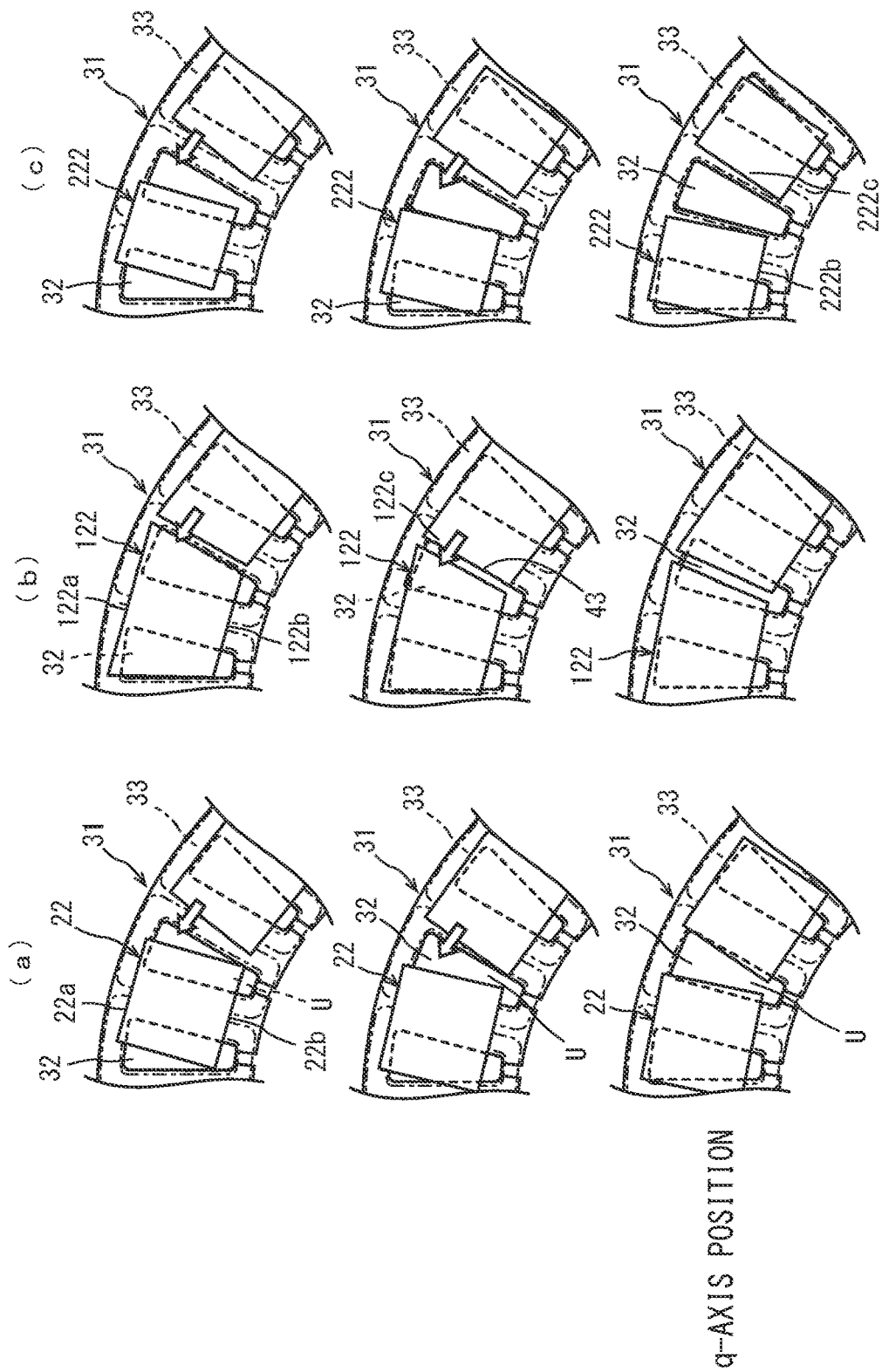
FIG. 10(a) illustrates a positional relationship between field magnets according to an embodiment and pressed powder teeth of a stator.
FIG. 10(b) illustrates a positional relationship between trapezoidal field magnets and pressed powder teeth of the stator.
FIG. 10(c) illustrates a positional relationship between field magnets having a width narrower than the field magnets of this embodiment and pressed powder teeth of the stator.

The field magnets 22 of the rotor 2 will now be described in detail with reference to FIGS. 9 and 10. FIG. 9 is a view illustrating a state where the rotor 2 rotates about the rotation axis P with respect to the stator 3, when seen along the axial directions. FIG. 10(a) illustrates a positional relationship between the field magnets 22 according to this embodiment and the pressed powder teeth 32 of the stator 3, FIG. 10(b) illustrates a positional relationship between trapezoidal field magnets 122 and the pressed powder teeth 32 of the stator 3, and FIG. 10(c) illustrates a positional relationship between field magnets 222 having a width narrower than that of the field magnets 22 of this embodiment and the pressed powder teeth 32 of the stator 3. FIGS. 10(a), 10(b), and 10(c) respectively show states where the field magnets 22, 122, and 222 move in the circumferential direction relative to the pressed powder teeth 32, in the order of the top view, the middle view, and the bottom view.

In the axial gap motor 1 according to this embodiment, the rotor 2 is located away from the stator 3 having the configuration described above, along the axial directions. The rotor 2 is subjected to a force in a direction of rotation about the rotation axis P by magnetic fluxes generated in the pressed powder teeth 32 by energization to the stator coils 33 and magnetic fluxes generated by the field magnets 22 of the rotor 2. In the axial gap motor 1, a torque generated by such rotation of the rotor 2 is output as an output torque.

As indicated by white arrows in FIG. 9, the field magnets 22 of the rotor 2 rotate about the rotation axis P relative to the pressed powder teeth 32 of the stator 3. For convenience of description, FIG. 9 does not show the rotor yoke 21 of the rotor 2 and the resin bobbins 34 of the stator 3, and shows the stator coils 33 by dot-dash lines.

The field magnets 22 are rectangular plate members. A circumferential length of a magnet-radial-direction-inner-end portion 22b located at the inner end of each field magnet 22 in the radial directions is equal to a circumferential length of a magnet-radial-direction-outer-end portion 22a located at the outer end of the field magnet 22 in the radial directions. As long as the circumferential length of the magnet-radial-direction-inner-end portion 22b is equal to the circumferential length of the magnet-radial-direction-outer-end portion 22a, the field magnets may have an arc side in plan view or may not have parallel sides.

In each field magnet, the circumferential length of the magnet-radial-direction-inner-end portion may be larger than the circumferential length of the magnet-radial-direction-outer-end portion.

The plurality of field magnets 22 are arranged at regular intervals along the circumferential direction in the rotor yoke flange 21b of the rotor yoke 21. In the field magnets 22, the magnet-radial-direction-inner-end portions 22b are located outward of the pressed-powder-tooth-radial-direction-inner-end portions 32b in the radial directions of the rotor 2. That is, when the rotor 2 and the stator 3 are seen along the axial directions, the pressed-powder-tooth-radial-direction-inner-end portions 32b of the pressed powder teeth 32 include portions not overlapping with the magnet-radial-direction-inner-end portions 22b of the field magnets 22. In the field magnets 22, the magnet-radial-direction-outer-end portions 22a are located outward of the pressed-powder-tooth-radial-direction-outer-end portions 32a in the radial directions of the rotor 2.

In a case where the rotor 2 rotates about the rotation axis P with respect to the stator 3 so that the field magnets 22 overlap with the pressed powder teeth 32 when the field magnets 22 and the pressed powder teeth 32 are seen along the axial directions as illustrated in FIG. 10(a), the magnet-radial-direction-inner-end portions 22b of the field magnets 22 first overlap with pressed-powder-tooth-radial-direction-inner portions U located inward of the center of the pressed powder teeth 32 in the radial directions. While the field magnets 22 are located at the q-axis position with respect to the pressed powder teeth 32, the field magnets 22 adjacent to each other in the circumferential direction overlap with one pressed powder tooth 32 when the field magnets 22 and the pressed powder tooth 32 are seen along the axial directions.

This configuration can increase a rotary force generated in the rotor 2 by magnetic fluxes occurring in the pressed powder teeth 32 by energization to the stator coil 33 and magnetic fluxes occurring in the field magnets 22. Thus, an output torque can be increased, as compared to an axial gap motor not having the configuration described above.

In addition, it is possible to prevent an abrupt increase of an overlapping area where the field magnets 22 overlap with the pressed powder teeth 32 when the field magnets 22 and the pressed powder teeth 32 are seen along the axial directions. Accordingly, a cogging torque and a torque ripple included in an output torque of the axial gap motor 1 can be reduced.

On the other hand, as illustrated in FIG. 10(b), for example, in the case of using, as field magnets, the trapezoidal field magnets 122 in which a circumferential length of a magnet-radial-direction-outer-end portion 122a is larger than a circumferential length of a magnet-radial-direction-inner-end portion 122b in plan view, when the rotor rotates about the rotation axis P with respect to the stator 3 so that the field magnets 122 start overlapping with the pressed powder teeth 32 when the field magnets 122 and the pressed powder teeth 32 are seen along the axial directions, an inner end portion and a center portion of the magnet-circumferential-direction-end portion 122c of each field magnet 122 in the radial directions overlap with the pressed-powder-tooth-side surface 43 of the pressed powder tooth 32.

Thus, in the combination of the field magnets 122 and the pressed powder teeth 32 as illustrated in FIG. 10(b), in the case where the field magnets 122 overlap with the pressed powder teeth 32 when the field magnets 122 and the pressed powder teeth 32 are seen along the axial directions, the overlapping area abruptly increases. Thus, a cogging torque and a torque ripple included in the output torque of the axial gap motor increase.

In the case illustrated in FIG. 10(b), while the field magnets 122 are located at the q-axis position with respect to the pressed powder teeth 32, the field magnets 122 adjacent to each other in the circumferential direction overlap with one pressed powder tooth 32, when the field magnets 122 and the pressed powder teeth 32 are seen along the axial directions. Thus, as in the field magnets 22 of this embodiment, a torque sufficient as an output torque of an axial gap motor can be obtained.

As illustrated in FIG. 10(c), in the case of using, as field magnets, the field magnets 222 having a smaller width than that of the field magnets 22 of this embodiment, while the field magnets 222 are located at the q-axis position with respect to the pressed powder teeth 32, the field magnets 222 adjacent to each other in the circumferential direction do not overlap with one pressed powder tooth 32, when the field magnets 222 and the pressed powder tooth 32 are seen along the axial directions. Thus, in the configuration of FIG. 10(c), the output torque of the axial gap motor is smaller than that in the case of the field magnets 22 of this embodiment.

In the combination of the field magnets 222 and the pressed powder teeth 32 as illustrated in FIG. 10(c), in a manner similar to FIG. 10(b), when the rotor rotates about the rotation axis P with respect to the stator 3 so that the field magnets 222 start overlapping with the pressed powder teeth 32 when the field magnets 222 and the pressed powder teeth 32 are seen along the axial directions, end portions and center portions of magnet-circumferential-direction-end portions 222c of the field magnets 222 in the radial directions overlap with the pressed-powder-tooth-side surfaces 43 of the pressed powder teeth 32.

Thus, in the combination of the field magnets 222 and the pressed powder teeth 32 as illustrated in FIG. 10(c), in a case where the field magnets 222 overlap with the pressed powder teeth 32 when the field magnets 222 and the pressed powder teeth 32 are seen along the axial directions, the overlapping area also abruptly increases. Thus, a cogging torque and a torque ripple included in the output torque of the axial gap motor increase.

In the configuration illustrated in FIG. 10(c), when the rotor rotates about the rotation axis P with respect to the stator 3, the magnet-radial-direction-inner-end portions 222b of the field magnets 222 do not overlap with the pressed-powder-tooth-radial-direction-inner portions of the pressed powder teeth 32 in some cases when the rotor and the stator 3 are seen along the axial directions (e.g., q-axis position). On the other hand, in the configuration of this embodiment illustrated in FIG. 10(a), when the rotor 2 rotates about the rotation axis P with respect to the stator 3, the magnet-radial-direction-inner-end portion 22b of at least one of the plurality of field magnets 22 always overlaps with the pressed-powder-tooth-radial-direction-inner portion U of the pressed powder tooth 32 when the rotor 2 and the stator 3 are seen along the axial directions.

Accordingly, as compared to the configuration of FIG. 10(c) including a state where the magnet-radial-direction-inner-end portions 222b of the field magnets 222 do not overlap with the pressed-powder-tooth-radial-direction-inner portions of the pressed powder teeth 32, the output torque of the axial gap motor can be increased, and a cogging torque and a torque ripple included in the output torque can be reliably reduced.

Figure 11:
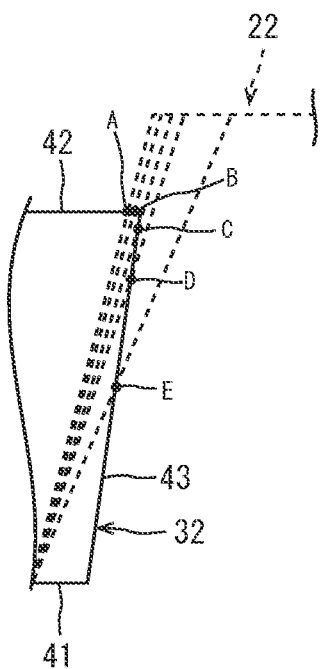
FIG. 11 is a view schematically illustrating a change of intersection points between trapezoidal field magnets and pressed powder teeth when the field magnets and the pressed powder teeth are seen along the axial direction while the field magnets are located at a q-axis position with respect to the pressed powder teeth by changing inclination of oblique sides of the trapezoidal field magnets.
Figure 12:
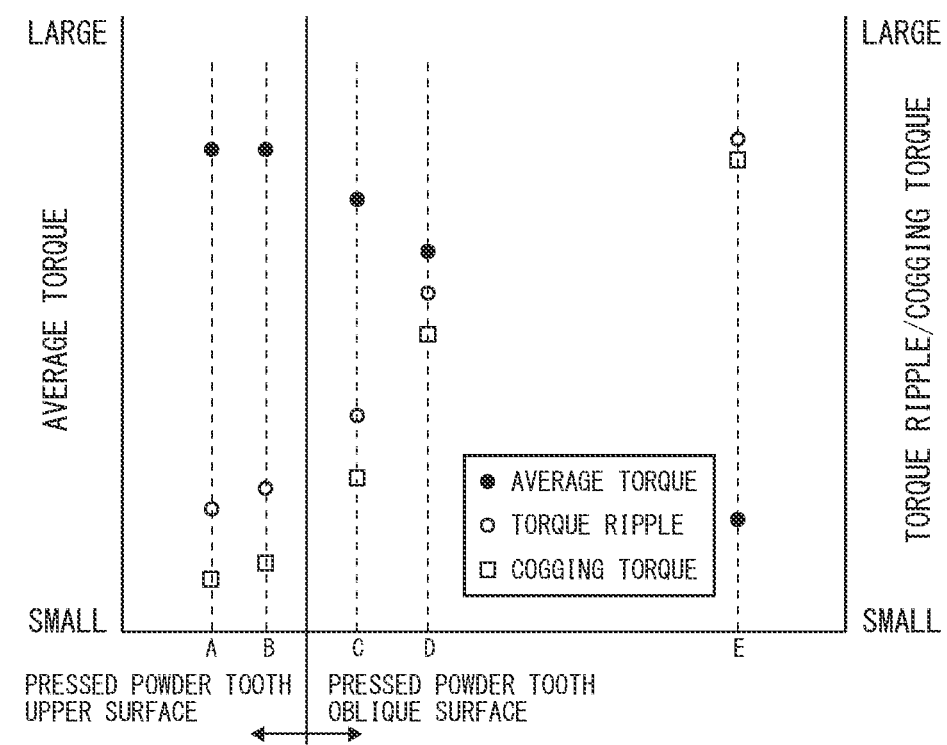
FIG. 12 is a graph showing a relationship between the intersection points, an average torque of an output torque of an axial gap motor and a torque ripple and a cogging torque included in the output torque in a case where the intersection points change as illustrated in FIG. 11.

FIG. 11 is a view schematically illustrating a change of intersection points between trapezoidal field magnets and the pressed powder teeth 32 when the field magnets and the pressed powder teeth 32 are seen along the axial directions while the field magnets are located at the q-axis position with respect to the pressed powder teeth 32 by changing inclination of oblique sides of the trapezoidal field magnets. FIG. 12 is a graph showing a relationship between the intersection points, an average torque of an output torque of an axial gap motor and a torque ripple and a cogging torque included in the output torque in a case where the intersection points change as illustrated in FIG. 11. Intersection points A through E in FIG. 12 correspond to intersection points A through E schematically shown in FIG. 11.

As shown in FIG. 12, in a case where while field magnets are located at the q-axis position with respect to the pressed powder teeth 32, the intersection points of the field magnets and the pressed powder teeth 32 are located on the pressed-powder-tooth-upper surfaces 42 when the field magnets and the pressed powder teeth 32 are seen along the axial directions, an average torque is larger and a torque ripple and a cogging torque are smaller than those in a case where the intersection points are located on the pressed-powder-tooth-side surfaces 43.

Thus, the field magnets 22 of the rotor 2 are preferably configured such that while the field magnets 22 are located at the q-axis position with respect to the pressed powder teeth 32, the field magnets 22 cover the pressed-powder-tooth-circumferential-direction-end portions 32c of the pressed powder teeth 32 when the rotor 2 and the stator 3 are seen along the axial directions.

OTHER EMBODIMENTS

Although the embodiment has been described above, the embodiment is merely an example. Thus, the present teaching is not limited to the embodiment described above, and the embodiment may be modified as necessary within a range not departing from the gist of the present teaching.

In the embodiment, the pressed powder teeth 32 are columnar members having substantially trapezoidal cross sections. Alternatively, the pressed powder teeth may be columnar members having another cross-sectional shape. Corner portions of the pressed powder teeth may have rounded portions or chamfered portions, for example.

In the embodiment, each resin bobbin 34 includes the side surface 34a, the bottom surface 34b, and the pressed-powder-tooth-positioning portion 34c. Alternatively, the resin bobbin may not have the bottom surface. The resin bobbin may not have a part of the side surface of the trapezoidal cross-sectional shape. The resin bobbin may not have the pressed-powder-tooth-positioning portion.

In the embodiment, in the field magnets 22, the magnet-radial-direction-inner-end portions 22b are located radially outward of the pressed-powder-tooth-radial-direction-inner-end portions 32b in the radial directions of the rotor 2. Alternatively, in the field magnets, the magnet-radial-direction-inner-end portions may be located at the same position as the pressed-powder-tooth-radial-direction-inner-end portions in the radial directions, or may be located inward of the pressed-powder-tooth-radial-direction-inner-end portions in the radial directions.

In the embodiment, the field magnets 22 are configured to cover the pressed-powder-tooth-circumferential-direction-end portions 32c of the pressed powder teeth 32 when the rotor 2 and the stator 3 are seen along the axial directions while the field magnets 22 are located at the q-axis position with respect to the pressed powder teeth 32. Alternatively, the field magnets may be configured to cover a part of the pressed-powder-tooth-circumferential-direction-end portions of the pressed powder teeth when the rotor and the stator are seen along the axial directions while the field magnets are located at the q-axis position with respect to the pressed powder teeth.

In the embodiment, the plurality of field magnets 22 have a size enough to allow the magnet-radial-direction-inner-end portion 22b of at least one of the plurality of field magnets 22 to always overlap with each of the pressed-powder-tooth-radial-direction-inner portions U of the plurality of pressed powder teeth 32 when the rotor 2 and the stator core 30 are seen along the axial directions when the rotor 2 rotates about the rotation axis P with respect to the stator core 30. Alternatively, in the plurality of field magnets, the magnet-radial-direction-inner-end portion of at least one of the plurality of field magnets may not always overlap with each of the pressed-powder-tooth-radial-direction-inner portions of the plurality of pressed powder teeth when the rotor and the stator core are seen along the axial directions while the rotor rotates about the rotation axis with respect to the stator core.

In the embodiment, when the rotor 2 rotates about the rotation axis P with respect to the stator 3 so that the field magnets 22 overlap with the pressed powder teeth 32 when the field magnets 22 and the pressed powder teeth 32 are seen along the axial directions, the magnet-radial-direction-inner-end portions 22b of the field magnets 22 first overlap with the pressed-powder-tooth-radial-direction-inner portions U of the pressed powder teeth 32. Alternatively, when the field magnets overlap with the pressed powder teeth, portions of the field magnets other than the magnet-radial-direction-inner-end portions may first overlap with the pressed powder teeth.

In the embodiment, in the case where the rotor 2 rotates about the rotation axis P with respect to the stator 3, the magnet-radial-direction-inner-end portion 22b of at least one of the plurality of field magnets 22 always overlaps with the pressed-powder-tooth-radial-direction-inner portion U of the pressed powder tooth 32 when the rotor 2 and the stator 3 are seen along the axial directions. Alternatively, portions of the field magnets 22 other than the magnet-radial-direction-inner-end portions 22b may overlap with the pressed powder teeth.

REFERENCE SIGNS LIST 1 axial gap motor
2 rotor
3 stator
4 gap
21 rotor yoke
21a rotor yoke projection
21b rotor yoke flange
22, 122, 222 field magnet
22a, 122a magnet-radial-direction-outer-end portion
22b, 122b, 222b magnet-radial-direction-inner-end portion
122c, 222c magnet-circumferential-direction-end portion
30 stator core
31 base yoke
32 pressed powder tooth (tooth)
32a pressed-powder-tooth-radial-direction-outer-end portion (tooth-radial-direction-outer-end portion)
32b pressed-powder-tooth-radial-direction-inner-end portion (tooth-radial-direction-inner-end portion)
32c pressed-powder-tooth-circumferential-direction-end portion (tooth-circumferential-direction-end portion)
33 stator coil
34 resin bobbin
34a side surface
34b bottom surface
34c pressed-powder-tooth-positioning portion
34d opening
35 tooth hole
35a tooth-hole-radial-direction-outer-end portion
35b tooth-hole-radial-direction-inner-end portion
35c slit
36 positioning-portion-insertion hole
37 slot
41 pressed-powder-tooth-bottom surface
42 pressed-powder-tooth-upper surface
43 pressed-powder-tooth-side surface
P rotation axis
S pressed-powder-tooth-housing space
U pressed-powder-tooth-radial-direction-inner portion

The invention claimed is:

1. An axial gap motor comprising:
a rotor rotatable about a rotation axis, the rotor including a plurality of field magnets arranged around the rotation axis;
a cylindrical stator core aligned with the rotor in an axial direction of the stator core, such that the rotation axis of the rotor is in the axial direction, the stator core including
a yoke, and
a plurality of teeth arranged along a circumferential direction of the stator core around the yoke; and
a plurality of stator coils respectively wound around the plurality of teeth, wherein
each of the plurality of teeth is formed of pressed particles;
in a view of the plurality of teeth in the axial direction of the stator core, each of the plurality of teeth extends along a radial direction of the stator core, and has
a tooth-radial-direction-outer-end portion located at an outer end of said each tooth in the radial direction of the stator core,
a tooth-radial-direction-inner-end portion located at an inner end of said each tooth in the radial direction of the stator core, and
a tooth-radial-direction-inner portion located inward of a center of said each tooth in the radial direction of the stator core,
said each tooth being formed of a trapezoidal shape in which a circumferential length of the tooth-radial-direction-outer-end portion is larger than a circumferential length of the tooth-radial-direction-inner-end portion;
each two of the plurality of teeth adjacent to each other in the circumferential direction of the stator core form a slot for accommodating the stator coil, the slot being of a rectangular shape in said view of the plurality of teeth in the axial direction;
each of the plurality of field magnets has
a magnet-radial-direction-inner-end portion located at an inner end of said each field magnet in the radial direction of the stator core, and
a magnet-radial-direction-outer-end portion located at an outer end of said each field magnet in the radial direction of the stator core,
a circumferential length of the magnet-radial-direction-inner-end portion being greater than or equal to a circumferential length of the magnet-radial-direction-outer-end portion; and
the rotor and the stator core are configured to rotate relative to each other about the rotation axis, by which, in a view of the rotor and the stator core in the axial direction of the stator core,
a part of each of the plurality of field magnet first overlaps with the tooth-radial-direction-inner portion of one of the plurality of teeth, and
in a case where the plurality of field magnets are located at a quadrature axis (q-axis) position with respect to the plurality of teeth, each adjacent two of the plurality of field magnets overlap with one of the plurality of teeth.

2. The axial gap motor according to claim 1, wherein
each of the plurality of teeth further has tooth-circumferential-direction-end portions located at end portions of said each tooth in the circumferential direction of the stator core and extending in the radial direction of the stator core, and
each of the plurality of field magnets is configured to cover the tooth-circumferential-direction-end portions of adjacent ones of the plurality of teeth, in said view of the rotor and the stator core in the axial direction while the field magnets are located at the q-axis position with respect to the teeth.

3. The axial gap motor according to claim 1, wherein
the plurality of field magnets is so configured that the magnet-radial-direction-inner-end portion of at least one of the plurality of field magnets always overlaps with each tooth-radial-direction-inner portion of the plurality of teeth in said view of the rotor and the stator core in the axial direction of the stator core in a case where the rotor and the stator core rotate relative to each other about the rotation axis.

4. The axial gap motor according to claim 1, wherein
each of the plurality of field magnets has a rectangular shape in which the circumferential length of the magnet-radial-direction-inner-end portion is equal to the circumferential length of the magnet-radial-directionouter-end portion, in said view of the rotor in the axial direction of the stator core.

5. The axial gap motor according to claim 1, wherein each of the plurality of field magnets is configured such that the magnet-radial-direction-inner-end portion thereof is located outward of the tooth-radial-direction-inner-end portion of each of the plurality of teeth in the radial direction of the stator core, in said view of the rotor and the stator core in the axial direction of the stator core.

* * * * *